Nov. 14, 1967    H. G. LESLEY    3,352,995
BUTT WELDING TOOL FOR FLASH REMOVAL AND WORK HARDENING
Filed June 18, 1964

INVENTOR.
HUBERT G. LESLEY
BY
Newton, Hopkins & Jones
ATTORNEYS

United States Patent Office 3,352,995
Patented Nov. 14, 1967

3,352,995
BUTT WELDING TOOL FOR FLASH REMOVAL AND WORK HARDENING
Hubert G. Lesley, % The Aid Corporation, Clayton, Ga. 30525
Filed June 18, 1964, Ser. No. 376,068
13 Claims. (Cl. 219—97)

This invention relates to welding and is particularly concerned with a method of and apparatus for flash butt welding hollow members so that a scale free smooth internal surface results.

In the flash butt welding of tubular members wherein the ends of the members are positioned in adjacent alignment, heated to fusion temperature by an electric current flowing through the ends of these members, and pressed together to form a permanent union; difficulty has been experienced in producing a welded joint that is internally smooth, strong, free from scale and precisely aligned with the adjoining metal of the welded members.

Heretofore ceramic or metal inserts have been used in attempting to accomplish these desirable features. Since such previous inserts were not moved as an incident to the welding operation, no shearing action was provided by which the inserts could remove the scale and flash material incident to the welding operation.

Where such inserts have attempted to provide complete support of the joint during the welding operation by having a continuous cross section corresponding to that of the inside of the hollow members to insure a smooth surface under the welded joint, such inserts not only prevented the metal heated by the electric current from that flashing inside as well as outside the members necessary to produce a completely homogeneous welded joint, but also did not conduct heat away from the inside of the welded joint at the same rate at which the heat was dissipated from the outside of the welded joint. This resulted in a non-homogeneous welded joint of substantially less strength than a desired homogeneous welded joint.

Other previous inserts attempting to allow the metal heated by the electric current to flash inwardly within the members provided a channel to be located adjacent the ends of the members into which the metal was allowed to flash. This channel, however, allowed the welded joint to become misaligned due to insufficient support, and allowed the formation of scale and an internal weld bead of flash metal on the inside of the welded joint whereby the removal of the insert without its destruction was prevented.

The present invention overcomes these and other problems associated with previous welding inserts by providing in combination with a channel in which the heated metal is allowed to flash, a plurality of knives shaped to conform with the inside of the members to be welded. Thus, upon moving the present insert longitudinally within the members immediately after the welding operation, the knives will shear away the flash material and scale on the inside of the welded members so as to form metal chips and scale fragments easily removable from the inside of the members. Moreover, movement of the present insert immediately after the welding operation is completed will physically work the metal of the welded joint while it is at a sufficiently elevated temperature to allow hot working. After the movement of the insert, the present insert allows a selected heat conducting medium to flow in contact with the inside of the welded joint to produce a homogeneous grain structure.

These and other features and advantages of the present invention will be more clearly understood from consideration of the following specification in conjunction with the accompanying drawings in which like characters of reference denote corresponding parts throughout and in which.

These figures and the following detailed description disclose a specific embodiment of the present invention but the invention is not limited to the details disclosed herein, since it may be embodied in other equivalent forms.

Figure 1:
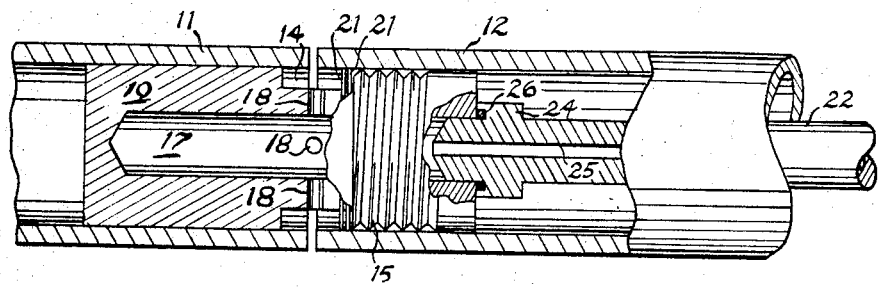
FIG. 1 is an elevational view of one embodiment of the present invention partially broken away and in position under a joint to be welded.

Referring to FIG. 1, the present invention is seen to comprise a generally cylindrical body 10, having an outside diameter substantially equal to the inside diameter of members 11 and 12, to be welded. The cylindrical body 10 is preferably formed of a shatterable ceramic material of sufficient strength to support the welded joint during the welding operation since it is proposed to shatter and dispose of the cylindrical body 10, after the welding operation is completed.

Approximately midway of the length of the cylindrical body 10, there is provided an annular flash channel 14 which extends into and around the cylindrical body 10 in a plane perpendicular to the axis thereof. The depth of the flash channel 14 is such that the molten metal formed between the ends of the members 11 and 12 during the welding operation may flash inwardly and the width of the flash channel 14 is sufficient to permit appropriate spacing between members 11 and 12 for effective welding without departure from the area of the groove.

Extending around and into the cylindrical body 10 from the flash channel 14, there is provided a support thread 15 which communicates with the flash channel 14 at its inner end and extends around the cylindrical body 10 outwardly from the channel 14, but terminates inwardly of the end of the cylindrical body 10. The diameter of the lands of the thread 15 is preferably equal to the outside diameter of the cylindrical body 10, and thus the lands support the welded joint after the cylindrical body 10 is moved, as will be explained later. With respect to the diameter of the cylindrical body 10, it is to be noted that the cylindrical body 10 is somewhat loosely fitted within the ends of the members 11 and 12, with such clearance as to permit restricted flow of gas from the spaces formed by the thread 15 and thence outwardly beyond the ends of the body 10. This restricted flow of gas insures that foreign particles of fluids do not move along the length of the cylindrical body 10 into the area of the weld.

A gas cavity 17 extends from the threaded end of the cylindrical body 10 into the opposite end of the cylindrical body 10. In the plane of the channel 14, a plurality of ports 18 extend radially outward from the gas cavity 17, thereby connecting it with the flash channel 14.

For clearing the weld section of flash material, scale, and the like, the inner wall of the channel 14 is provided with a plurality of slots 20, mounting segmented arcuate scarfing blades or knives 21 therein. The knives 21 are positioned in two offset rows around the flash channel 14, which positions the knives 21 perpendicular to the center line of the cylindrical body 10. Moreover, the slots 20, position the knives 21 so that each of the spaces left between adjacent knives 21 of one row is covered by a knife 21 of the other row as the cylindrical body 10 is moved longitudinally within the members 11 and 12. Therefore, when viewed parallel to the center line of the cylindrical body 10, the knives 21 form a continuous circle within the flash channel 14 of a diameter equal to the diameter of the cylindrical body 10.

Figure 2:
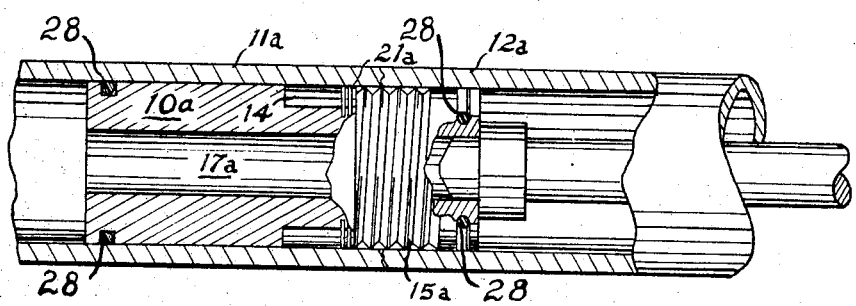
FIG. 2 is a similar view of a second embodiment of the present invention shown after movement of the present invention with respect to the welded joint.
Figure 3:
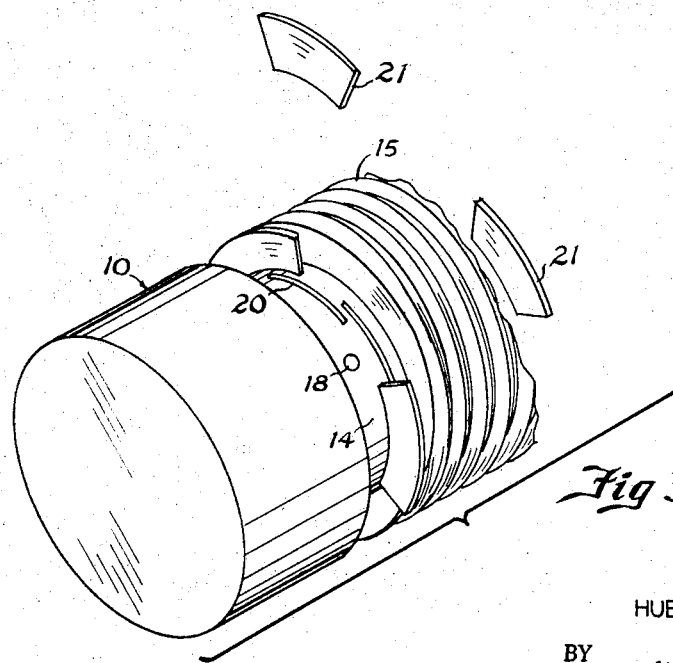
FIG. 3 is an exploded view of the embodiment of the present invention shown in FIG. 1.

A push rod 22, having a flange 24 thereon, and a central gas passage 25 therethrough is provided for moving the cylindrical body 10 longitudinally within the members 11 and 12 immediately after the welding operation and while the members are still at elevated temperatures. The diameter of the push rod 22 outwardly and adjacent the flange 24 permits its insertion in the outer end of the gas cavity 17, and an O-ring 26 held by the flange 24 seals the flange 24 to the cylindrical body 10 so as to prevent gas flowing into the gas cavity 17 through the central gas passage 25 from escaping the gas cavity 17 when the push rod 22 is inserted into the gas cavity 17. Gas may be admitted into the gas cavity 17 through the gas passage 25 of the push rod 22 and into the flash channel 14 and the spaces formed by the thread 15 through the ports 18. Thus, when required by welding, cooling air or inert gas from any convenient source (not shown) may be delivered into the flash channel 14 and the spaces formed by the thread 15 through the gas passage 25.

Where the welding does not require the presence of cooling air or inert gas, that form of the invention shown in FIG. 2 may be employed for welding members 11a and 12a. This embodiment of the invention comprises a cylindrical body 10a similar to the cylindrical body 10 in FIG. 1. A flash channel 14a similar to the flash channel 14 in the first embodiment extends around the cylindrical body 10, but the cavity 17a similar to the cavity 17 extends completely through the cylindrical body 10. A thread 15a communicates with and extends along the cylindrical body 10a in the same manner as the thread 15 extends along the cylindrical body 10. An O-ring 28 extends around the cylindrical body 10 just inwardly of each of the ends thereof and serves to seal the cylindrical body 10 to the members 11a and 12a so as to prevent foreign particles of fluids from contacting the welded joint while the cylindrical body 10a is within the area of the weld.

In the welding operation using that form of the insert shown in FIG. 1, the cylindrical body 10 with the knives 21 positioned within the slots 20, is positioned within the members 11 and 12 with the ends of the members 11 and 12 over the flash channel 14. Just prior to the application of the electric current, inert gas may be introduced into the flash channel 14 and into the spaces formed by the thread 15 through the gas passage 25 in the push rod 22 and allowed to flow during the entire welding operation. The electric current is then applied while the members 11 and 12 are pressed toward each other in the conventional manner known in the art.

Immediately after the welded joint is formed, the push rod 22 moves the cylindrical body 10 longitudinally along the inside of the members 11 and 12 until the welded joint is supported by the thread 15 of the cylindrical body 10. As the cylindrical body 10 is moved longitudinally along the members 11 and 12, the knives 21 strike the flash material and scale on the inside of the welded joint and shear it away in easily removable small segments and chips. This shearing away of the flash material and scale by the knives 21 while the metal is at an elevated temperature substantially equal to the fusion temperature serves to hot work the metal of the welded joint in known manner so that later recrystallization of the metal is with a sufficiently small grain size to produce a strong welded joint. The metal in the welded joint is then allowed to cool while being supported by the thread 15 and purged by the inert gas passing through spaces formed by the thread 15. It will be understood that movement of the thread 15 into position against the welded joint serves to correct any misalignment of the members 11 and 12 while at the same time permitting the continuing flow of cooling air or inert gas to the welded joint.

After the metal in the welded joint has cooled, the cylindrical body 10 and knives 21 are slidably removed if the configuration of the members 11 and 12 will permit and the device is ready for reuse in a subsequent operation. If the configuration of the members 11 and 12 prevents such removal, the cylindrical body 10 may be shattered and the knives 21 may be retrieved for use in another cylindrical body 10.

The second embodiment of the present invention shown in FIG. 2 is used in the same manner as described above except that no inert gas is introduced within the flash channel 14a and the spaces formed by the thread 15a. However, atmospheric air is trapped within the flash channel 14a and the spaces formed by the thread 15a and serves as a heat conducting medium both during and after the welding operation thereby producing a welding joint having a homogeneous crystalline structure throughout. The O-rings 28 act to seal the cylindrical body 10a to the inside of the members 11a and 12a and prevent any foreign matter coming into contact with the inside surface of the welded joint. The second embodiment is removed from the members 11a and 12a in the same manner as the first embodiment is removed from the inside of the members 11 and 12 after the completion of the welding operation.

It will be obvious to those skilled in the art that many variations may be made in the embodiment chosen for the purpose of illustrating the present invention without departing from the scope thereof, as defined by the appended claims.

What is claimed as invention is:

1. An axially movable body for use in internally cleaning, hot working and aligning a welded joint between adjacent ends of axially aligned hollow tubular metallic members, said body defining a recess constructed and arranged to bridge the adjacent ends during the welding operation and the welded joint after the welding operation; means mounted within said recess for removing weld material protruding from the welded joint into said recess upon axial movement of said body with respect to the welded joint, said means for removing weld material comprising a plurality of offset arcuate scarfing knives; means for simultaneously supporting the welded joint during axial movement of said body with respect to the welded joint; and means for communicating a heat conducting medium between said body and the welded joint said means for communicating comprising a cast helical passageway extending around said body.

2. An axially movable body as recited in claim 1 wherein said passageway comprises a helical thread having its outermost surface within the circumferential surface of the body and extending around said body, said thread defining a cavity communicating with said recess, and said body includes means for supplying a fluid medium to said recess and said cavity.

3. An axially movable body for use in producing a welded joint between adjacent ends of axially aligned hollow tubular members, said body defining a recess constructed and arranged to bridge the adjacent ends of the members during the welding operation and the welded joint after the welding operation; means mounted within said recess for removing weld material protruding into said recess when said body is axially moved with respect to the welded joint, said means for removing weld material comprising a plurality of offset arcuate knives; means for supporting the welded joint after movement of said body with respect to the welded joint, means for communicating a heat conducting medium between said body and the welded joint, said means for communicating comprising a helical land and groove arrangement having its outermost surface in the circumferential surface of the body and extending around and along said body, said arrangement defining a continuous cavity communicating with said recess; and means for supplying a fluid, heat conducting medium to said recess and said cavity, said means comprising an internal passage within said body and a plurality of ports defined by said body and communicating with said recess and said internal passage.

4. An insert for use in the joining of axially aligned adjacent ends of hollow tubular metal members by welding which includes a body having spaced ends conforming in external shape and size with the internal shape and size of the adjacent ends of the members to be joined, said body defining a circumferential recess between said spaced ends adapted to be positioned in internal registration with the adjacent ends of the members to be joined by welding; at least one knife removably mounted in a fixed position within said recess and extending outwardly therefrom a distance sufficient to engage the interior surfaces of the ends to be joined; and means for communicating a fluid medium to a position adjacent the welded joint.

5. An insert for use in the joining of axially aligned adjacent ends of hollow tubular metal members by welding which includes a body having spaced ends conforming in external shape and size with the internal shape and size of the adjacent ends of the members to be joined, said body defining a circumferential recess between said spaced end adapted to be positioned in internal registration with the adjacent ends of said tubular members to be joined by welding; a plurality of knives mounted in fixed positions within said recess and extending outwardly therefrom a distance sufficient to engage the internal surfaces of the ends of the tubes; said body defining a substantially helical thread disposed about its external surface extending from said recess over at least a portion of said body; and means for communicating a fluid medium into said recess.

6. An insert for use in the joining of axially aligned adjacent ends of hollow tubular metal members by welding which includes a body having spaced ends conforming in external shape and size with the internal shape and size of the adjacent ends of the members to be joined, said body defining a circumferential recess between said spaced ends adapted to be positioned in internal registration with the adjacent ends to be joined by welding; a plurality of knives mounted in a fixed position within said recess and extending outwardly therefrom a distance sufficient to engage the interior surface of the adjacent ends to be joined; a helical land and groove arrangement having outer lands in the circumferential surface of the body, said arrangement extending into and around said body and defining a cavity communicating with said recess; and means for communicating a fluid medium into said recess, said means comprising an internal passage defined by said body.

7. A movable welding insert for sustaining axial alignment of adjacent ends of tubular hollow members during the uniting of the ends by a welding operation, for rectifying deformation of said ends incident to the application of heat thereto, and for removing inwardly protruding metal and scale from the welded area by relative movement of the insert with respect to the welded joint after the welding operation and before the welded joint cools substantially below the heat of fusion, which includes:
(a) a substantially solid body preferably formed of shatterable material and generally conforming in external configuration and dimensions with the internal configuration and dimensions of the adjacent ends of the tubular members, said body defining an annular channel intermediate the ends thereof and extending inwardly of said body, said channel being adapted to be positioned in registration with the adjacent ends of the members during a welding operation to unite the adjacent ends;
(b) at least one knife seated in said recess and protruding outwardly therefrom to present a continuous cutting edge conforming with the configuration of said body beyond said recess and movable with said body after the welding of said adjacent ends so as to remove inwardly protruding scale and weld metal from the weld area, and to work the metal of the weld area so that its grain structure is compatible with the grain structure of the members beyond the weld area; and
(c) surface threads defined by a portion of said body adjacent said recess, the thread groove formed thereby communicating with said annular channel so that fluids within said channel will flow through said groove and away from said channel to expedite cooling of the weld area while the lands of said threads support the weld area during cooling of said area.

8. An axially movable insert for use in internally cleaning, hot working and aligning a welded joint between adjacent edges of aligned hollow tubular metal members comprising an axially movable body defining a recess constructed and arranged to bridge the adjacent edges of the tubular members during welding and the welded joint after welding; means associated with said body for supporting the welded joint during axial movement of said body with respect to the welded joint and communicating a heat conducting medium between said body and the welded joint; and means mounted within said recess for removing weld material protruding into said recess from the welded joint upon axial movement of said body with respect to the welded joint, said means for removing weld material comprising a plurality of offset arcuate scarfing members.

9. An axially movable insert for use in internally cleaning, hot working and aligning a welded joint between adjacent ends of axially aligned hollow tubular metallic members comprising:
(a) an axially movable body defining a recess constructed and arranged to bridge the adjacent ends of the axially aligned tubular members during the welding operation and the welded joint between the tubular members after the welding operation;
(b) means mounted within said recess for removing weld material protruding from the welded joint into said recess upon axial movement of said body with respect to the welded joint; and
(c) means for communicating a fluid medium to said body and the welded joint.

10. An axially movable insert as recited in claim 9 including means for introducing a fluid medium into said recess and adjacent the welded joint.

11. An axially movable insert as recited in claim 10 wherein said means for communicating a fluid medium comprises a cast helical passageway extending around said body.

12. An axially movable insert for use within aligned tubular members both before and after the welding of adjacent ends thereof comprising:
(a) an axially movable body defining a recess constructed and arranged to bridge the adjacent ends of the tubular members;
(b) means mounted within said recess for removing weld material protruding from a welded joint between the adjacent ends into said recess upon axial movement of said body with respect to the welded joint; and
(c) means for communicating an inert gas to a position adjacent the welded joint.

13. An axially movable insert as recited in claim 12 wherein said means for removing weld material comprises at least one radially extending scarfing member engaging the interior surface of at least one tubular member.

References Cited

UNITED STATES PATENTS

| | | | |
|---|---|---|---|
| 402,107 | 4/1889 | Ries | 219—160 X |
| 2,403,229 | 7/1946 | Murray et al. | 29—481 |
| 2,794,244 | 6/1957 | Ulecker | 29—481 |
| 2,796,843 | 6/1957 | Kleppinger | 219—160 X |
| 2,897,586 | 8/1959 | Hatch | 29—481 |
| 3,015,018 | 12/1961 | Rudd | 219—67 |
| 3,028,469 | 4/1962 | Bognar | 219—8.5 |
| 3,134,012 | 5/1964 | Neukom et al. | 219—101 |
| 3,201,864 | 8/1965 | Jones et al. | 219—128 X |
| 3,259,969 | 7/1966 | Tessman | 219—97 X |

FOREIGN PATENTS

| | | |
|---|---|---|
| 551,181 | 5/1932 | Germany. |
| 343,043 | 1/1960 | Switzerland. |

RICHARD M. WOOD, *Primary Examiner.*

B. A. STEIN, *Assistant Examiner.*